Patented Sept. 5, 1950

2,521,665

UNITED STATES PATENT OFFICE 2,521,665

STILBENE DISULFONIC ACID DERIVATIVES

Heinrich Häusermann, Basel, Switzerland, assignor to J. R. Geigy A. G., Basel, Switzerland, a Swiss company No Drawing. Application October 11, 1949, Serial No. 120,820. In Switzerland May 27, 1949

6 Claims. (Cl. 260—507)

1

The present invention is concerned with the manufacture of optical brightening agents, i. e., practically colourless to slightly yellow coloured substances which when present in very small quantities on a more or less white substrate fluoresce violet-blue to green-blue in ultraviolet light and in daylight, in which they are affected by the ultraviolet component. In this way they have an optical brightening effect on the substrate. In particular the invention is concerned with an improvement in the manufacture of optical brightening agents from 4.4'-diamino-stilbene-2.2'-disulfonic acid by acylation of the amino groups to give benzoyl derivatives whose benzoyl radicals have a particularly favorable optical effect, as will be described in detail below.

It has been known for a long time that acyl derivatives of 4.4'-diamino-stilbene-2.2'-disulfonic acid have the property of acting as optical brightening agents because of their blue fluorescence in daylight. They do this by compensating the yellowish self-color of incompletely white substrates with their bluish radiation. During the technical use of this property it soon appeared that the nature of the acyl radicals was important, in fact that the acyl radical played in many ways a decisive part in deciding the usability of the final product. Thus an optical brightening agent satisfies modern demands only when it emits a blue fluorescence which is as pure as possible, i. e., when its shade is neither too red nor too green. For example, 4.4'-dibenzoylamino-stilbene-2.2'-disulfonic acid which was proposed at one time as an optical brightening agent for textiles never reached any great practical importance because of its shade being too red. In contrast thereto the substituted benzoyl derivatives of 4.4'-diamino-stilbene-2.2'-disulfonic acid according to the present invention are distinguished by possessing a much purer blue fluorescence.

A further requirement for modern optical brightening agents is a high intensity of fluorescence in the active substance, firstly on purely economical grounds. Secondly, because of the slightly yellowish self-colour of technical 4.4'-diamino-stilbene-2.2'-disulfonic acid and its benzoyl derivatives, it is necessary to attain a good brightening effect with minimal quantities of substances of high intensity because greater quantities can disturb the optical brightening effect produced on a white substrate. For this reason too, it is necessary to use compounds which fluoresce as intensely as possible so that

2 even in the smallest concentration they have a powerful brightening action. Whereas the intensity of fluorescence of 4.4'-dibenzoylamino-stilbene-2.2'-disulfonic acid is very small, some of its derivatives suitably substituted in the benzene ring of the benzoyl group have an activity which is many times that of the parent body. Thus, for example, 4.4'-di-(4'''-aminobenzoylamino)-stilbene-2.2'-disulfonic acid is a strongly fluorescing optical brightening agent but has the disadvantage of very poor fastness to light. However, it is essential that the active substance should have a good fastness to light, since otherwise the optical effect will vanish much too rapidly in daylight with the very small concentration used on the surface of the material to be brightened, so that only the yellowish self-color of the decomposition products will remain, causing an increased yellowing instead of a brightening effect. We have now found that certain acylated derivatives of 4.4'-diamino-stilbene-2.2'-disulfonic acid deriving from m-cresotinic acid have not only an intensity of fluorescence which is higher than previously known comparable compounds, but also possess very good fastness to light. A further advantage of the derivatives according to the invention is that they can be easily produced from starting materials which are readily available and inexpensive.

The m-cresotinic acid derivatives of 4.4'-diamino-stilbene-2.2'-disulfonic acids according to the invention have the general formula

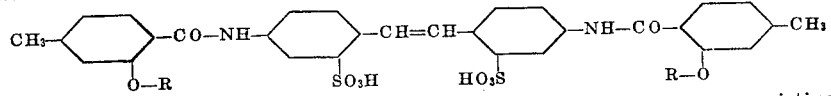

wherein R stands for one of the group consisting of the radicals $CH_3$, $C_2H_5$, $C_3H_7$, $-CH_2-CH_2OH$ and $CH_2-CH(OH)-CH_2OH$.

The nature of these substituents R although not having a very great influence of the fluorescence of the compounds, can have a favourable effect on the solubility in water of the alkali salts of the compounds according to the invention. Thus the hydroxy alkyl derivatives have an outstandingly good solubility in water.

The m-cresotinic acid derivatives of 4.4'-diamino-stilbene-2.2'-disulfonic acid according to the invention are obtained from the parent body by treatment with acylating agents, i. e., with derivatives of m-cresotic acids suitable for acylation of their derivatives acylated or alkylated at the hydroxy group, until the disappearance of the primary amino groups, whereupon the acyloxy groups can be converted, if desired, to hydroxyl groups by mild saponification, e. g., in aqueous medium with alkalis, the hydroxyl groups being then alkylated. This method has special advantages if the alkyl group of the alkoxy radical is to contain further substituents which would be changed in an undesirable manner on preparing the halide from the carboxylic acid with the agents normally suitable therefor, e. g. conversion of the hydroxyl group in the hydroxy alkyl group on using thionyl chloride. Acylation to give the derivatives according to the invention is carried out preferably with an aqueous solution of the alkali salts of 4.4'-diamino-stilbene-2.2'-disulfonic acid by suspending therein the substituted m-cresotinic acid halides of the invention and allowing the reaction to proceed at low, ordinary or slightly raised temperature. It is more advantageous to work with heterogeneous phases by vigorously agitating the solution of the substituted m-cresotinic acid halide in an organic liquid which is inert and non-miscible with water, e. g., a solution in benzene, toluene, chlorobenzene or nitrobenzene, with the aqueous solution of the alkali salts of 4.4'-diamino-stilbene-2.2'-disulfonic acid. On the other hand organic solvents miscible with water may also be added, for example, lower ketones such as acetone which promote the solution of the benzoyl halides, which may be solid. The presence of agents neutralising mineral acids such as sodium acetate or of acid binding agents such as sodium carbonate, calcium carbonate and magnesium carbonate or magnesium oxide is advisable in this process.

It is true that a process has been described very recently giving the manufacture of 4.4'-di-(2''-alkoxy-benzoyl-amino)-stilbene-2.2'-disulfonic acid and pointing out the valuable properties of these compounds as optical brightening agents. In that description it is emphasized that only compounds with exactly the above constitution represent valuable brightening agents, only the alkyl radical of the alkoxy group being susceptible of a slight variation in that it may be an aliphatic hydrocarbon radical with 1 to 4 carbon atoms. In contrast thereto the surprising discovery has been made that the 4.4'-di-(4''-methyl-2''-alkoxy-benzoylamino)-stilbene-2.2'-disulfonic acids are not only distinguished by a blue fluorescence but surpass the known compounds considerably in their intensity of fluorescence and are very suitable for use as optical brightening agents. This is particularly surprising in view of the known fact that very small changes in a substitution of the benzene ring contained in the benzoyl group are accompanied by pronounced alterations in optical properties. Furthermore, the ready availability of these compounds makes their use a distinct gain to the industry. The especially valuable 4.4'-di-(4''-methyl-2''-alkoxy-benzoylamino)-stilbene-2.2'-disulfonic acids surpass considerably known compounds in intensity of fluorescence, so that they produce brightening effects which are not obtainable with higher concentrations of previously known compounds because of the emergence of visible and disturbing self-colors.

The 4.4'-di-(4''-methyl-2''-alkoxy-benzoylamino)-stilbene-2.2'-disulfonic acids or their alkali salts are more or less faintly yellow colored compounds which dissolve in hot water giving practically colorless solutions and having even in very small quantities a powerful optical brightening effect on more or less white substrates. Because of their substantivity they may be used for the optical brightening of cellulose fibres and can also serve as additives to agents used for treating textiles, e. g. as additives to soaps, cleaning agents, washing and rinsing liquors.

The following examples illustrate the invention without restricting it; parts are parts by weight and temperatures are in degrees centigrade. The relationship of parts by weight to parts by volume is that of kilograms to litres.

*Example 1*

A solution of 42.5 parts of 2'-acetoxy-4-methyl-benzoyl chloride in 150 parts by volume of benzene is added at 0–10°, while stirring well, to 37 parts of 4.4'-diamino-stilbene-2.2'-disulfonic acid, 10.6 parts of soda ash and 30 parts of crystalline sodium acetate dissolved in 1000 parts of water. After stirring for 10 hours at 0–10° sufficient 15% sodium carbonate solution is run in to render the mixture alkaline to brilliant yellow. It is then heated to 80–90° and kept alkaline to phenolphthalein at this temperature by the addition of 15% sodium carbonate solution until all the acetoxy groups are saponified, which is seen when the mixture remains alkaline. The benzene is distilled off using an inclined condenser and the reaction product salted out with 60 parts of common salt. The product is the disodium salt of 4.4'-di-(2''-hydroxy-4''-methyl-benzoylamino)-stilbene-2.2'-disulfonic acid which after drying is a yellowish powder soluble in water.

68.2 parts of this stilbene derivative are dissolved in 1400 parts of water and 8 parts of 100% NaOH and methylated by stirring at 50–60° with 25.2 parts of dimethyl sulfate. The reaction product separates from the solution in the form of an easily filterable mass and after drying is a powder which is only faintly yellowish. The disodium salt of 4.4'-di-(2''-methoxy-4''-methyl-benzoylamino)-stilbene-2.2'-disulfonic acid is fairly readily soluble in hot water; on cooling a hot saturated, aqueous solution the new compound separates out as a gelatinous, intensely blue to bluish-violet fluorescing mass. The new compound has a very strong affinity for cellulose fibres. Even in concentrations as low as 0.0001% an aqueous solution of this new stilbene derivative is excellently suited for brightening white textile articles.

*Example 2*

37 parts of 4.4'-diamino-stilbene-2.2'-disulfonic acid are dissolved in 1000 parts of water with the addition of 10.6 parts of soda ash and stirred at 0–10° with a solution of 36.9 parts of 2-methoxy-4-methyl-benzoyl chloride in 150 parts by volume of benzene, the hydrochloric acid set free being neutralised by the addition of sodium carbonate. The product is the same as in Example 1.

*Example 3*

If the 25.2 parts of dimethyl sulfate in Example 1 are replaced by 30.8 parts of diethyl sulfate the product is the disodium salt of 4.4'-di-(2''-ethoxy-4''-methylbenzoylamino)-stilbene-2.2'-disulfonic acid which is a faintly yellowish powder with properties similar to those of the product obtained according to Example 1 or 2. This compound is even more effective as a brightening agent than the methoxy derivative obtained according to the previous 2 examples.

*Example 4*

34.1 parts of the disodium salt of 4.4'-di-(2''-hydroxy-4''-methyl-benzoylamino)-stilbene-2.2'-disulfonic acid obtained as in Example 1 are dissolved in 700 parts of water and 4 parts of 100% NaOH and stirred at 60–70° with 8.05 parts of ethylene chlorohydrine. The reaction product separates as an almost colorless mass and after drying is a faintly yellowish powder which is readily soluble in water. This derivative, the disodium salt of 4.4'-di-(2''-β-hydroxyethoxy-4'''-methylbenzoylamino)-stilbene - 2.2' - disulfonic acid, is more soluble in water than the products of Examples 1 and 3, but possesses nonetheless adequate affinity for cellulose fibres, and thanks to its strong fluorescent properties is excellently suited for brightening cellulose fibres of every kind.

If the ethylene chlorohydrine in this example is replaced by 11 parts of glycerine monochlorohydrine then a product with quite similar properties is obtained.

Example 5

A solution of 42.5 parts of 2-isopropoxy-4-

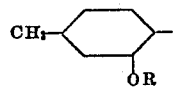

methylbenzoyl chloride in 150 parts of acetone is added at 0–10° while stirring well to 37 parts of 4.4'-diamino-stilbene-2.2'-disulfonic acid dissolved in 1000 parts of water with 10.6 parts of soda ash, the hydrochloric acid set free being neutralised at the same time with 15% sodium

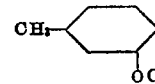

carbonate solution. After the reaction is over, the acetone is distilled off and the disodium salt of 4.4'-di-(2''-isopropoxy - 4''-methylbenzoyl-

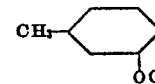

amino)-stilbene-2.2'-disulfonic acid acylated by filtration.

After drying, the product is a yellowish powder

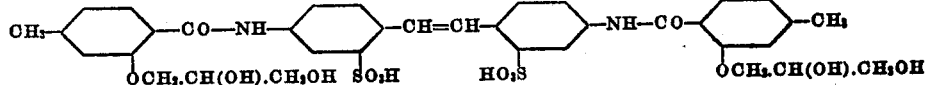

which dissolves in hot water and has similar properties as a brightening agent to the compound described in Example 3.

Example 6

1 part of white textile goods is washed in the

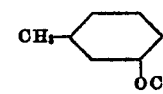

usual way at 90–100° in 10 parts of a wash liquor containing 3 grams of curd soap, 2 grams of sodium carbonate and 0.001 g. of the brightening agent obtained according to Example 1 or 2 per liter of liquor. After rinsing and drying, the goods are a brilliant white with no trace of an unpleasant reddish tint.

Example 7

White cotton material is dyed with 0.02% of the stilbene derivative obtained according to Example 3 in the presence of 5% of Glauber's salt for 15 minutes at 40° with a liquor ratio of 1:50. After rinsing and drying, the treated material has a much whiter appearance than before treatment.

What I claim is:

1. A brightening agent selected from the group consisting of the disulfonic acids of the formula

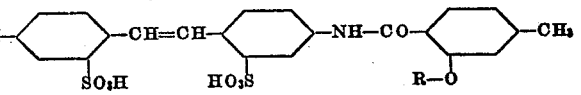

wherein R represents a member selected from the group consisting of the radicals $CH_3$, $C_2H_5$, $C_3H_7$, $C_2H_4OH$ and $CH_2.CH(OH).CH_2OH$, and the alkali metal salts of the said disulfonic acids.

2. A brightening agent selected from the group consisting of the disulfonic acid of the formula

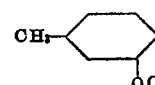

and the disodium salt thereof.

3. A brightening agent selected from the group consisting of the disulfonic acid of the formula

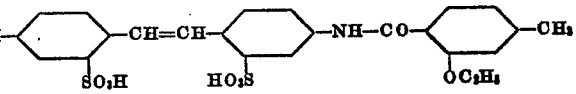

and the disodium salt thereof.

4. A brightening agent selected from the group consisting of the disulfonic acid of the formula

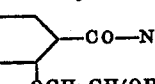

and the disodium salt thereof.

5. A brightening agent selected from the group consisting of the disulfonic acid of the formula

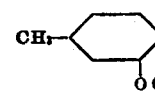

and the disodium salt thereof.

6. A brightening agent selected from the group consisting of the disulfonic acid of the formula

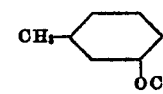

and the disodium salt thereof.

HEINRICH HÄUSERMANN.

REFERENCES CITED

The following references are of record in the file of this patent:

UNITED STATES PATENTS

| Number | Name | Date |
|---|---|---|
| 2,468,431 | Eberhart | Apr. 26, 1949 |

OTHER REFERENCES

Fiat, Final Report #1302; Office of Military Gov. for Germany (U. S.); "The Blankaphors" by Richardson, page 14.